Nov. 9, 1965    M. LEFEVRE    3,216,635
APPARATUS FOR TRACING AND BREAKING GLASS SHEETS
Filed Feb. 19, 1962    4 Sheets-Sheet 1

INVENTOR.
MICHEL LEFEVRE
BY
Bauer and Seymour
ATTORNEYS

Nov. 9, 1965  M. LEFEVRE  3,216,635
APPARATUS FOR TRACING AND BREAKING GLASS SHEETS
Filed Feb. 19, 1962  4 Sheets-Sheet 4

INVENTOR.
MICHEL LEFEVRE
BY
Bauer and Seymour
ATTORNEYS

United States Patent Office 3,216,635
Patented Nov. 9, 1965

3,216,635
APPARATUS FOR TRACING AND BREAKING GLASS SHEETS
Michel Lefevre, Aachen, Germany, assignor to Compagnie de Saint-Gobain, Neuilly-sur-Seine, France
Filed Feb. 19, 1962, Ser. No. 173,909
Claims priority, application France, Feb. 23, 1961, 853,666
12 Claims. (Cl. 225—96.5)

This invention relates to a method and apparatus for automatically cutting sections from a sheet of glass.

In the glass cutting field it is well known to provide a method and apparatus for tracing a glass sheet at one point in the apparatus and to break the sheet along this traced line at another point in the apparatus. One of the disadvantages of this type of apparatus and method is that the break frequently does not occur at the trace or drawn line because of the difficulty of realigning the trace or drawn line with the breaking mechanism. If the trace line is not exactly in alignment with the breaking mechanism it will cause the break to run in an undesirable direction. Another disadvantage is due to the fact that during the tracing operation stresses favorable to the breaking of the glass along the trace line are brought about in the depth of the glass. These stresses, however, do not remain for a very long period of time. Consequently, if there is a lapse of time between the tracing and the breaking the advantage of these stresses is not obtained and the breaking occurs under less favorable conditions.

One object of the present invention is to provide a method and apparatus for quickly and efficiently severing sections from a sheet of glass.

Another object of the present invention is to provide a method and apparatus for forming a trace line on the surface of the glass sheet and breaking said sheet along the trace line without moving the same.

Another object is to provide a method and apparatus for forming a trace line on a glass sheet and automatically applying a breaking pressure to said sheet along the trace line immediately after the formation of the trace line.

Another object is to provide a method and apparatus for automatically aligning a glass sheet relative to a tracing means.

Another object is to provide a method and apparatus for positioning a tracing means relative to one edge of a glass sheet.

Another object is to provide a method and apparatus for forming a trace line on the surface of a glass sheet which is automatically spaced from the edges of said sheet.

Another object is to provide a method and apparatus for uniformly applying a trace line transversely of said sheet irrespective of the position of the edge of the sheet relative to the tracing means.

Another object is to provide a method and apparatus for applying a breaking pressure along a trace line to insure an even and clean break of said sheet only along said trace line.

A still further object is to provide a method and apparatus for applying a breaking pressure to a sheet of glass only along a trace line and which will eliminate all stresses in said sheet except along said trace line.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings wherein like reference characters refer to like parts throughout the several views.

Figure 1:
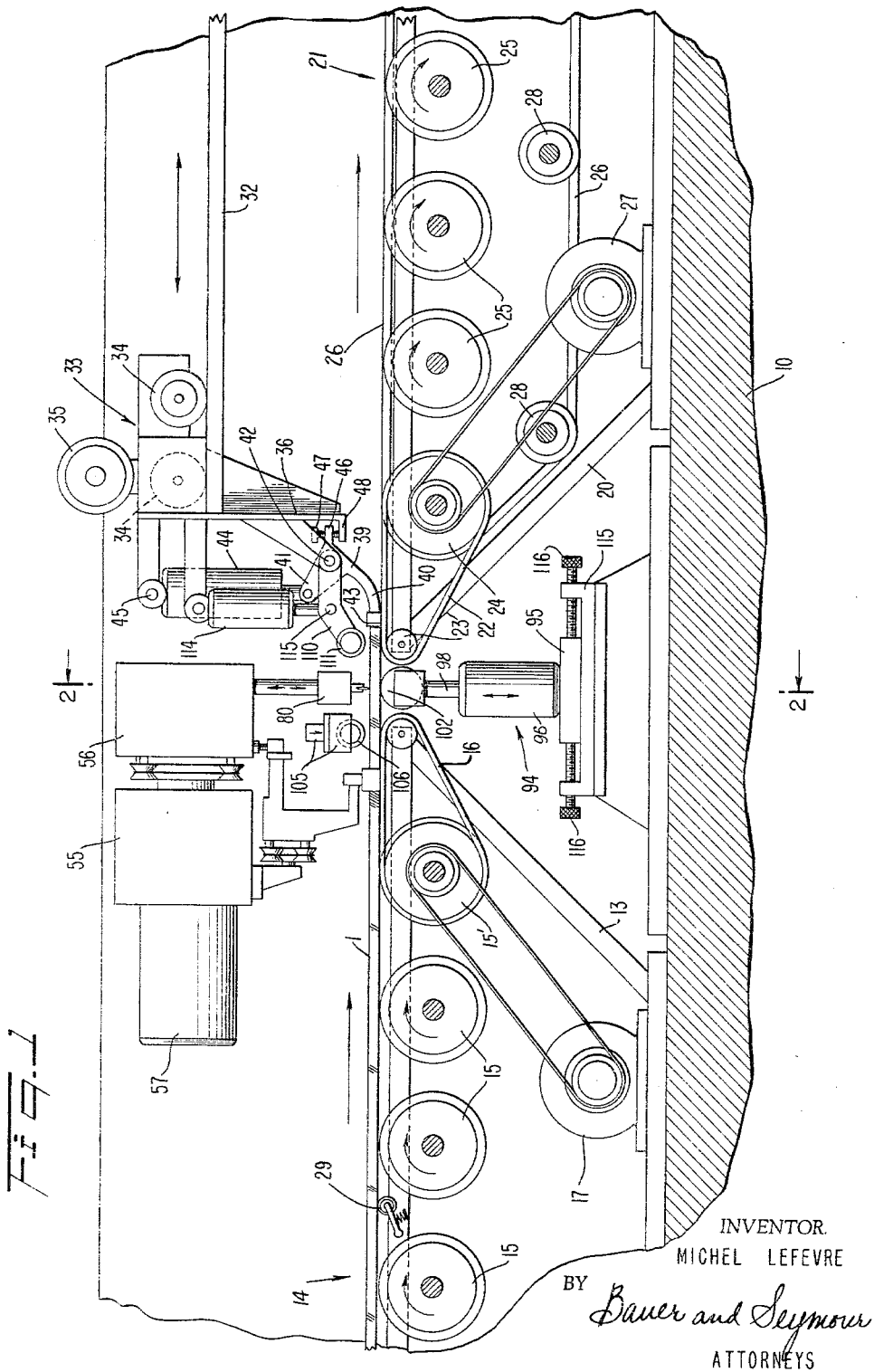
FIGURE 1 is a side elevational view of the apparatus.
Figure 2:
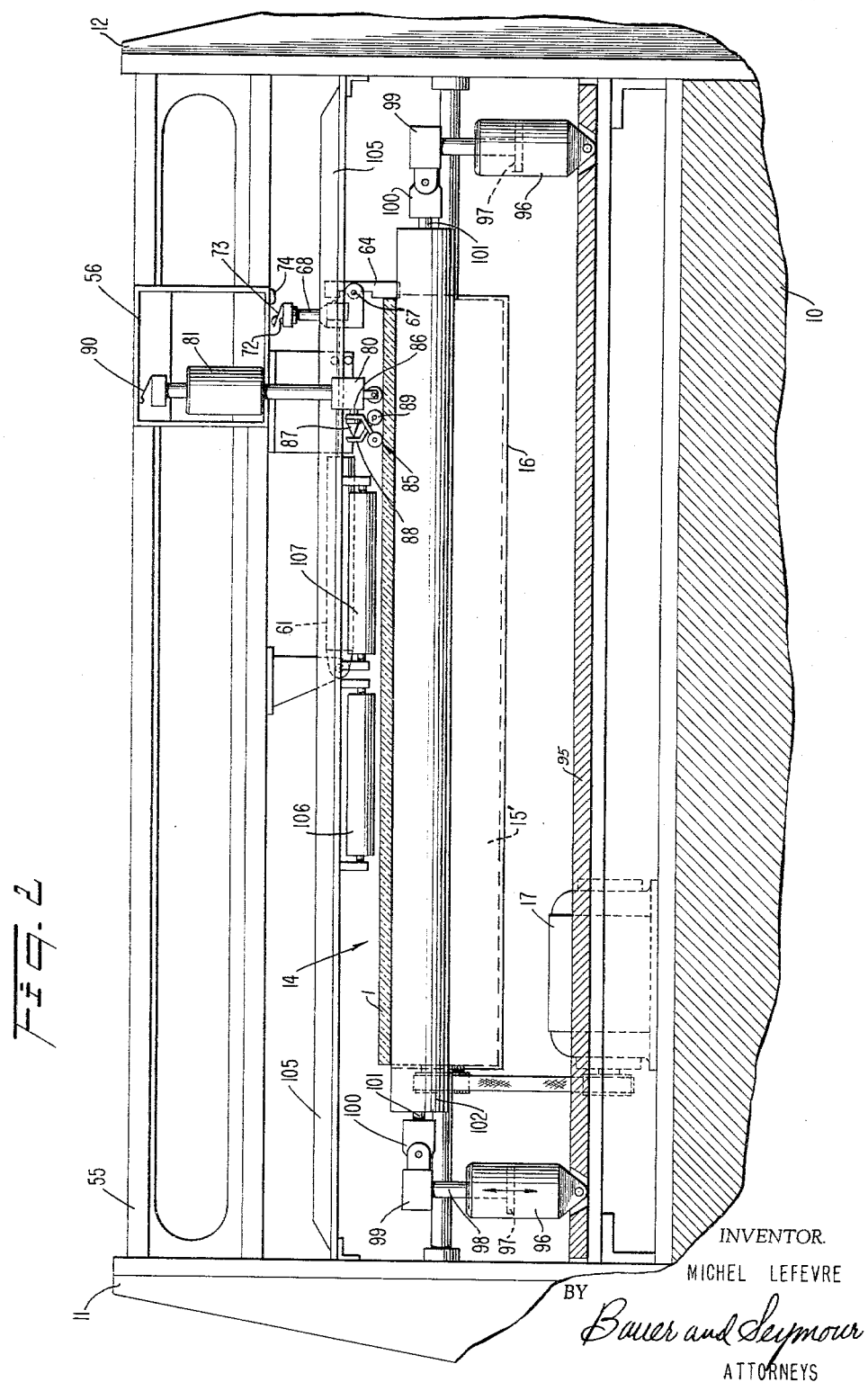
FIGURE 2 is an end elevational view taken along line 2—2 of FIGURE 1.
Figure 4:
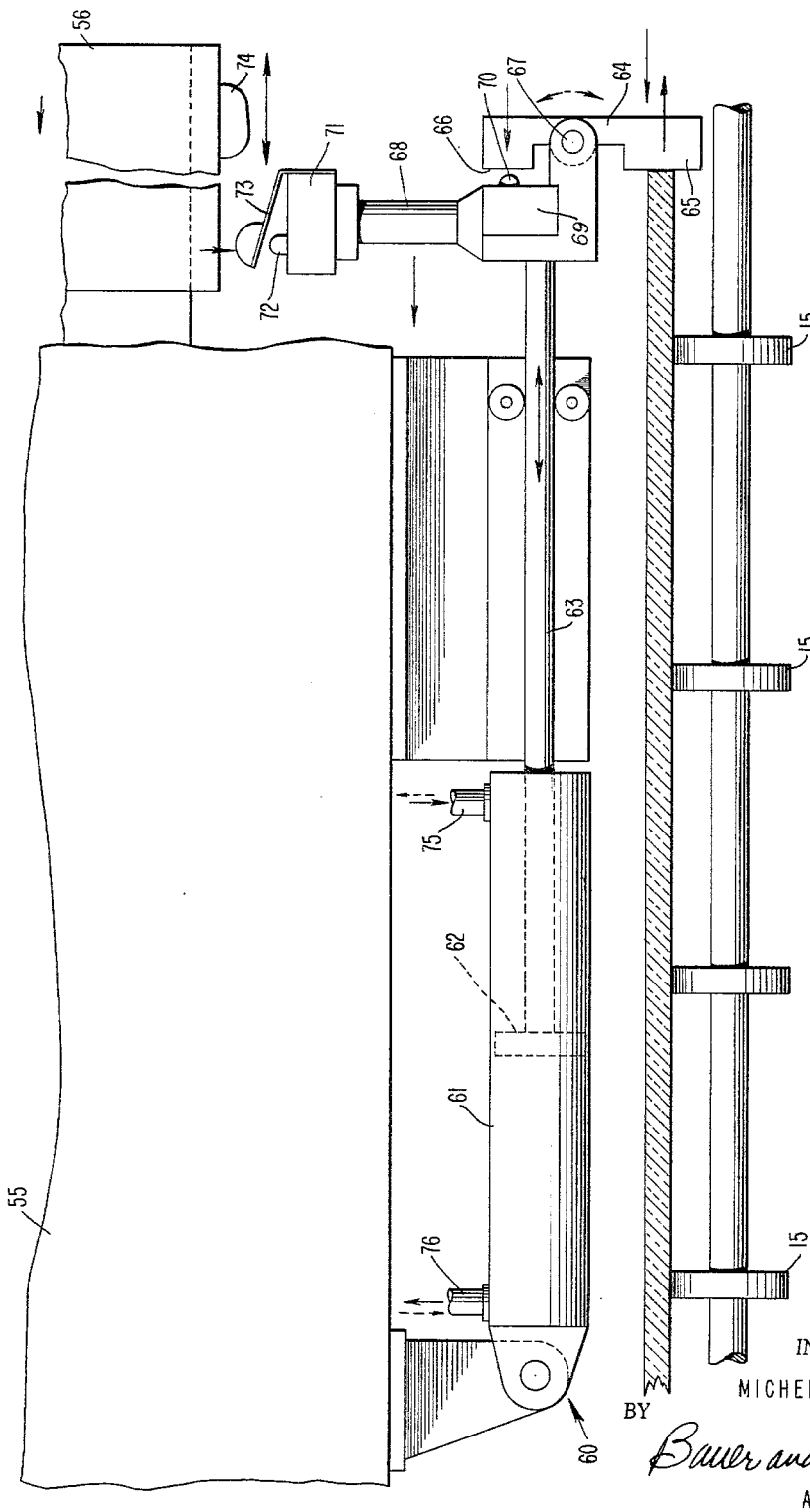

FIGURE 4 is an enlarged sectional end elevational view of a portion of the apparatus of FIGURE 2, the section being taken in generally the same manner as that of FIG. 2, FIG. 4 showing the sensing means for locating one edge of a sheet of glass; and FIGURE 5 is a fragmentary side elevational view similar to FIGURE 1 but on an enlarged scale showing the conveyor stop means, the figure also showing a modified sheet breaking member and a modified sheet aligning member.

Referring now to the drawings there is shown in FIGURES 1 and 2 a base 10 and a pair of upwardly extending support means 11 and 12 which are secured to the base. Secured to the base 10 is a frame 13 for an upstream conveyor means 14 which comprises a plurality of rollers 15 having their ends mounted in suitable bearings in frame 13 for supporting a glass plate 1 for movement in a horizontal path. A belt 16, having a width in excess of the width of glass sheets that are fed thereto, is mounted over a freely rotatable roller 23 mounted on the forward end of frame 13 and over a rearwardly mounted driven roller 15'. The belt 16 has its upper reach extending in the same horizontal plane as the tops of rollers 15. A motor 17 having a conventional belt and pulley arrangement drives roller 15' and thus the belt 16 which in turn feeds a sheet of glass in a horizontal plane. A frame 20 is mounted on base 10 and supports a downstream conveyor 21 one end of which is spaced laterally a suitable distance from the upstream conveyor 14 to permit the positioning of a tracing and breaking means between the conveyors as will hereinafter be described. The end of conveyor 21 which is adjacent conveyor 14 comprises a plurality of narrow belt sections 22 which are spaced apart from each other and which extend transversely of the apparatus. Belts 22 are mounted over spaced apart rollers 23' and 24. Rollers 23', 24 and belts 22 form a conveyor having the same width as the belt 16. A series of parallel rollers 25 support the upper reaches of a plurality of spaced apart endless belts 26. The belts 26 extend over the roller 24 and are positioned between the spaced apart belt members 22. A motor 27, through a conventional belt and pulley arrangement rotates the roller 24 which in turn moves the belts 22 and 26. A plurality of rollers 28 are adjustably mounted on frame 20 to tighten the belts 26. The plurality of parallel belts 22 and 26 are thus able to carry small size panes of glass. Mounted between a pair of the rollers 15 on the upstream conveyor 14 is a pivotally mounted roller 29 which is spring-loaded to normally extend into the path of movement of a sheet of glass moving across the tops of rollers 15. When a sheet of glass is positioned on conveyor 14 the roller 29 rides along its under surface and is held in a depressed position. In its depressed position roller 29 actuates a switch which supplies current to the apparatus and which closes the circuits to motors 17 and 27 thus starting conveyors 14 and 21.

Mounted above the downstream conveyor 21 are a pair of transversely spaced apart and longitudinally extending rail members 32 for supporting a transverse carriage 33. A pair of rollers 34 are mounted at each end of the carriage 33 and ride on the rails 32. A hand wheel 35 is rotatably mounted on the top of the carriage 33 and through a conventional worm and gear arrangement or any other suitable connection is operatively connected to one of the rollers 34 so that by rotation of the wheel 35 the carriage 33 may be moved horizontally along rails 32. In place of hand wheel 35 a motor could be operatively connected to drive one of the rollers 34 and through a conventional switch mechanism the motor could be made to reciprocate the carriage 33 horizontally along the rails 32. The forward end of the carriage 33 has a downwardly extending plate 36. A pair of identically constructed abutment or sheet alignment means connected to operate simultaneously are mounted on the plate 36 and are spaced on each side of the center line of the conveyors. Since both of the alignment means are of identical construction a description of one will be sufficient for an understanding of both. Each of the sheet alignment means is in the form of a bell crank 39 having arms 40 and 41. The bell crank is pivotally mounted at 42 to a bracket secured to the plate 36. The end of arm 40 has an end member 43 made of a resilient material for contacting the front end of a glass sheet without causing damage to said sheet. Arm 41 is pivotally secured to the end of a piston rod extending from a conventionally constructed pneumatic piston and cylinder structure 44. Cylinder 44 is in turn pivotally mounted at 45 to an arm which is secured to the plate 36. Bell crank 39 has an outwardly extending arm 46 in which is threadedly mounted a screw 47. The lower end of screw 47 contacts a horizontal ledge 48 on the plate 37 which limits the pivotal movement of bell crank 39. The cylinder and piston 44 is of conventional type whereby a source of fluid pressure (not shown) when controlled by means of a valve is directed against the upper surface of the piston to force the piston and piston rod downwardly which will cause the arm 40 to move away from the glass sheet in a counterclockwise motion as viewed in FIG. 1. When the fluid pressure is directed to the lower surface of the piston, the piston and piston rod are moved upwardly causing arm 42 to be pivotally moved toward the glass sheet in a clockwise motion as viewed in FIG. 1. The control of the fluid pressure to either side of the piston in the cylinder 44 is controlled by an electrically controlled valve mechanism (not shown). The clockwise movement of the arm 40 is limited by the screw 47 as the lower end thereof strikes the ledge 48. Thus by adjusting the screw 47 the distance that the arm 40 moves toward the glass sheet is adjustably controlled.

Located horizontally between the pair of sheet alignment means 43 is a conveyor stop means 50 comprising a roller 51 which is pivotally mounted to an arm 52 as more clearly shown in FIG. 5. The other end of arm 52 is pivotally mounted to a horizontally extending plate 53 which is secured at one end to the plate 36 on carriage 33. The roller 51 is normally retained in the forward position as viewed in FIG. 5 by suitable spring means (not shown). When a sheet of glass 1 is fed forward between conveyor belts 16 and 22 it first strikes the roller 51. Arm 52 has a switch means 54 which is actuated by any movement of arm 52 from the position as viewed in FIG. 5. Thus as a glass plate advances toward roller 51 the front edge of the sheet strikes the roller 51 moving it in a counterclockwise direction as viewed in FIG. 5. The movement of the roller 51 and its arm 52 actuates switch 54 which is operatively connected to the arm 52 which causes the circuits to the motors 17 and 27 to be opened thus stopping the conveyor. At the same time switch 54 actuates the cylinder and piston combination 44 by actuating the electrically controlled valve which in turn directs fluid pressure to the underside of the piston thus causing the bell crank 39 and arm 40 to rotate in a clockwise direction until stop 47 strikes the ledge 48. From the time that the front edge of the sheet strikes the roller 51 until the conveyors come to a stop, there is a slight forward motion of the sheet. The total length of forward stroke of each arm 40 is so adjusted that the entire sheet is pushed back a slight distance which has the effect of squaring the sheet between the horizontally spaced apart end members 43 on arms 40.

Extending over the upstream conveyor 14 and transversely of the apparatus is a frame 55 which supports a carriage 56. The ends of the frame 55 are secured to the upright members 11 and 12 respectively. The carriage 56 is so mounted on the frame 55 that it is slidable thereon and movable transversely of the conveyors 14 and 21. A motor 57 of the reversible type is operatively connected to the carriage 56 to move the same back and forth across the apparatus.

A sensing mechanism 60 is provided for locating one edge of the glass sheet and is shown in FIG. 4 as comprising a cylinder 61, piston 62 and piston rod 63. The cylinder 61 is pivotally mounted at one end to the under surface of the beam 55. The piston rod 63 is supported between rollers which are in turn rotatably mounted on a bracket secured to the undersurface of the beam 55. Secured to the outer end of the piston rod 63 is a sensing lever 64 having a sheet contacting surface 65 and a switch actuating surface 66. The lever 64 is pivotally mounted at 67 at a point slightly off center so that normally the actuating surface 66 will be spaced from a button 70 of a switch 69. Also secured to the outer end of the piston rod 63 is an upwardly extending switch support 68. The switch 69 carrying the actuating button 70 is mounted in the lower end of the support 68 and in alignment with the switch actuating surface 66 of lever 64. A switch 71 having an actuating button 72 is mounted on the top of support 68. A leaf spring 73 extends over the actuating button 72 and is so constructed that normally it is spaced above said button. An abutment 74 is secured to the bottom surface of the carriage 56. Fluid pressure is supplied to the cylinder 61 at either side of the piston 62 by means of ports 75 and 76. An electrically operated valve mechanism (not shown) directs the fluid pressure either into port 75 or port 76. A tracing wheel or tool 80 is mounted in the carriage 56 for vertical reciprocal movement toward and away from the glass sheet and is driven by a motor 81 which is operatively connected to the tracing tool support as more particularly described in applicant's French Patent No. 1,215,209. In the normal "at rest" position the piston 62 of the sensing mechanism 60 is at the right end of the cylinder 61 as viewed in FIGS. 2 and 4. The carriage 56 in its "at rest" position is at the extreme right side of the frame 55 as viewed in FIG. 2. In such "at rest" positions the abutment 74 compresses leaf spring 73 which in turn depresses the button 72 of switch 71. When button 72 is held depressed the circuit to the carriage driving motor 57 is opened and the carriage 56 remains at rest. When switch 54 is actuated by the forward end of the sheet 1 said switch also actuates the control valve in the fluid pressure line to direct the fluid pressure to the cylinder 61 of the sensing mechanism through port 75 so that the piston 62 and rod 63 are moved to the left as viewed in FIG. 4. Such movement also carries the lever 64 to the left and toward the edge of the sheet 1 resting on the conveyor rollers 15. Switch 71 controls the current to the motor 57 which drives the carriage 56 along the frame 55 from right to left as viewed in FIGS. 2 and 4. As long as the button 72 of switch 71 is depressed by the abutment 74 this switch is open and motor 57 does not operate. As soon as the support 68 is moved to the left the abutment 74 on the carriage 56 is disengaged from the leaf spring 73 which permits the leaf spring to move upwardly away from button 72. Button 72 is upwardly spring loaded and its upward movement actuates switch 71 which in turn actuates the motor 57 which drives the carriage 56 to the left as shown in FIGS. 2 and 4. The leftward movement of the piston 62 and piston rod 63 carries the sheet contacting surface of the lever 64 toward the edge of the glass sheet 1 on the conveyor. When the surface 65 contacts the edge of the glass sheet the continued movement of the piston and piston rod to the left, as shown in FIG. 4, causes the lever 64 to pivot about pivot point 67 thus forcing the switch actuating surface 66 against the actuating button 70 of switch 69 so as to open the switch. Switch 69 is in normally closed position and is in the circuit controlling the actuation of the valve in the fluid pressure line to cylinder 61. Upon the opening of the switch 69 the control valve functions to cut off the fluid pressure to cylinder 61; consequently the movement of the contact support 68 and the controlling lever 64 are stopped. In the meantime, the carriage 56 continues its leftward movement until the abutment 74 depresses the leaf spring 73 and the button 72 of switch 71 which in turn interrupts the circuit to motor 57 and stops carriage 56. At this point the tracing tool 80 is positioned a predetermined distance from the edge of the glass sheet. It will thus be seen that, irrespective of the position of the edge of the glass sheet 1 on the conveyors, the sensing mechanism 60 will locate that edge and then automatically position the tracing tool relative to that edge. The switches 69 and 71 are connected in series with each other and are so constructed that when the buttons 70, 72 of said switches are depressed motor 81 is actuated to cause the tool 80 to move toward the glass sheet. Thus, after the edge of the sheet is located and the tracing tool, through the movement of its carriage 56 is positioned a predetermined distance from the located sheet edge, the motor 81 is actuated to move the tracing tool downwardly until it contacts the surface of the glass sheet.

The holder for the tracing tool has at its base a sensing element 85 having a switch 86 and the switch button 87. Button 87 is spring loaded whereby it is urged outwardly away from the switch. The sensing element 85 comprises a pair of spring loaded tong-like arms 88. The upper ends of the arms are positioned on either side of the switch button 87. The lower end of each arm has mounted thereon a roller 89. Thus as the tool holder and the tracing wheel are moved into contact with the top of the glass sheet the rollers 89 also contact the surface of the glass sheet and spread the upper ends of the arms 88 of the tong apart thus relieving any pressure on the spring loaded switch button 87, permitting it to move outwardly from the switch. The outward movement of the switch button 87 opens the circuit to the motor 81 thus stopping the positive downward motion of the tracing wheel and at the same time it closes the circuit to the motor 57 to cause the carriage 56 and the tracing wheel to move to the left as viewed in FIG. 2 and to thus form a trace line on the surface of the glass. The French Patent No. 1,215,209 describes in detail a mechanism for generating a strong pressure of the tool on the glass surface. Such a mechanism is not shown herein but forms a part of this apparatus. As the carriage 56 and tracing too 80 move to the left and toward the other edge of the sheet the sensing element 85 causes the carriage and tracing wheel to come to a stop before the tracing wheel reaches the opposite edge of the glass sheet. This is brought about by the fact that as the rollers 89 of the sensing element ride off the edge of the glass sheet the spring loaded arms 88 come together thus depressing the switch button 87 which in turn actuates switch 86 to open the circuit to the motor 57 thus halting any further transverse movement of the tracing tool. The actuation of switch 86 also actuates the circuit to the motor 81 causing it to move the tracing tool 80 upwardly away from the top surface of the sheet. A switch 90 has an operating lever in the path of movement of a portion of the vertical movement of tracing tool 80. When the tracing tool 80 reaches its full upward position the switch 90 is actuated which in turn causes the motor 57 to reverse itself and to move the carriage 56 to the right as viewed in FIG. 2 to the previously described "at rest" position. At the same time the closing of switch 90 actuates the electrically controlled valve in the fluid pressure supply for cylinder 44 in such a manner as to cause the piston therein to be moved downwardly thus pivotally moving the bell crank 39 in a counterclockwise direction which in turn rotatably moves the arm 41 in a counterclockwise direction to a position wherein the tip 43 on the end of arm 40 is beyond and above the horizontal path of movement of a glass sheet on conveyor 21.

The breaking device 94 as shown in FIGS. 1 and 2 is positioned below the tracing tool and comprises a base plate 95 and a pair of upwardly extending hydraulic jacks 96 suitably secured to each end of the base plate. Each of the hydraulic jacks 96 has a piston 97 and a piston rod 98. A block 99 is secured to the outer end of each of the piston rods 98. A bearing block 100 is pivotally mounted to each block 99 and rotationally supports the ends of shaft 101 of breaking roll 102. The breaking roll 102 can either be a tube member or a solid roll and is usually covered with a sheet of flexible material, for example rubber. In its "at rest" position it is so located that the circumference of the roll 102 will contact the lower surface of a glass sheet as it is moved across from conveyor 14 to conveyor 21 so that it is rotatably driven by the glass sheets during their transitory motion. A support 105 having its ends secured to the upright members 11 and 12 is positioned parallel to the frame 55 and above the forward end of the belt 16. A pair of rollers 106, 107 are rotatably mounted to the under surface of support 105. The rollers 106 and 107 are also mounted so that they may be manually adjusted in various set positions toward and away from the top surface of a glass sheet on the conveyors 14 and 21. A pair of levers 110 have one end secured to a bracket extending outwardly from the plate 36 on carriage 33. The other ends of the lever 110 serve as bearing surfaces to rotatably support the end of a shaft carrying a pair of rollers one of which is shown at 111. A hydraulic jack 114 has its upper end pivotally secured to a bracket extending from the plate 36. The lower end of the piston rod for the jack 114 is pivotally secured at 115 to one of the levers 110 whereby the rollers on said levers may be moved toward and away from the top surface of a glass sheet on the conveyors 14 and 21. As shown in FIG. 1 it will be observed that the levers 110 are of such a length that the rollers thereon are always positioned above the forward end of the glass sheet. It will also be observed that the plate 95 is horizontally slidable in a cradle 115 and is adjustably retained in the cradle by means of screws 116. By this means the center of the roll 102 may be moved into alignment with the center of the tracing tool and consequently with the trace line which is formed on the top surface of the glass sheet by the tracing tool. There is an electrically operated control valve (not shown) operatively connected with the fluid pressure source for each of the jacks 96 so that the fluid pressure may be selectively directed to either side of the piston 97 in said jacks. When switch 90 is closed by the upward movement of the tracing tool it actuates the control valve for the fluid pressure source for jacks 96 so that the fluid pressure is directed to the underside of the pistons 97 thus causing the breaking tool 102 to be raised. The upward movement of roll 102 raises the glass sheet toward the rollers 106 and 107, and the two rollers one of which is shown at 111, and concentrates the upward pressure along a line opposite from the trace line. Upon being raised the upper surface of the glass sheet abuts the rollers 106, 107 and the rollers on levers 110 at points which are spaced apart from but parallel to the trace lines formed on the glass sheet thus promoting opening of the trace line. Since the rollers 106, 107 and the rollers on levers 110 are freely rotatably mounted they offer the advantage, with respect to fixed abutments, of lending themselves to the stresses to which the sheet is subjected while being raised. The rollers 106, 107 have a stationary position once they are adjusted manually to the desired height above the glass sheet. The rollers 111, 112 are pivotally supported on the carriage 33 and through the hydraulic jacks 114 are vertically movable under the pressure of the rising sheet and operate always in proximity of the front edge of the sheet. Hydraulic jacks 114 are of conventional construction whereby fluid pressure may be selectively directed to either side of the hydraulic piston to cause rollers 111, 112 to move toward or away from the path of movement of a glass sheet. Hydraulic pressure may be selectively applied to jacks 114 to move rollers 111, 112, downwardly to create a downward pressure on the forward edge of the glass sheet simultaneously with the upward movement of the breaking roll 102. Assuming the cutting of a narrow strip, which is the case shown in FIG. 1, it is then possible to exert a dynamic pressure on the front edge of the sheet, owing to which opening of the trace line is brought about. The modification as shown in FIG. 5 shows the breaking roller 102 replaced by a U-shaped bar 120. The upward extending contact surfaces 121 on the bar 120 are covered with a flexible material to give a resilient cushion when the bar 120 is moved upwardly to contact the glass sheet. Bar 120 attacks the sheet on either side of the trace line. The breaking occurs without causing any scaling-off. In this modification the normal "at rest" position of the bar 120 is positioned below the path of movement of the glass sheet during its transitory movement.

The operation of the apparatus is as follows: A glass sheet 1 is placed on the conveyor 14 which actuates the switch 29 to supply electricity to the electrical circuits thus starting the conveyors 14 and 21. The sheet is fed by the conveyors until the forward end strikes the roller 51 and actuates the switch 54. Switch 54 in turn stops the conveyors 14 and 21 and at the same time actuates the piston within cylinder 44 to cause the sheet alignment means 40 to move toward the forward end of the sheet. The alignment means contacts the sheet and pushes it backward a slight distance and simultaneously squares the forward end with the trace line forming means. Switch 54 also actuates the piston 62 in the sensing mechanism 60 to cause the sensing lever 64 to move toward the edge of the glass sheet. When the contacting surface of the sensing lever 64 contacts the edge of the sheet it causes the surface 66 to depress the button 70 of switch 69 which in turn shuts off the fluid pressure within cylinder 61. When the sensing lever 64 is moved along its sensing path it carries the leaf spring 73 out of contact with the abutment 74 on the tool carriage 56. This permits the actuating button 72 of switch 71 to be raised thus closing the circuit to the motor 57. The carriage 56 is then driven to the left as viewed in FIGS. 2 and 4 and continues in such a direction until the abutment 74 through leaf spring 73 once again depresses the button 72 to open the circuit to the motor 57 thus stopping the carriage 56. At this time the edge of the glass has been located and the tracing tool has been positioned a predetermined distance inwardly from the located edge of the glass sheet. Also at this position of the carriage 56 the actuating buttons for the switches 69 and 71 are simultaneously depressed which causes the actuation of the motor 81 to move the tracing tool vertically downwardly toward the top surface of the glass sheet. When the tracing tool 80 contacts the glass sheet the switch 86, associated therewith, is actuated to stop its downward movement and at the same time causes the carriage 56 to move to the left, that is transversely across the glass sheet toward the opposite edge thereof. When the tracing tool has moved within a predetermined distance of said opposite edge of the sheet the switch contact 87 is depressed. The depression of the contact 87 stops the movement of the tracing tool carrier 56 and at the same time actuates the motor 81 to raise the tracing tool 80 upwardly away from the top surface of the sheet. When the tracing tool reaches its uppermost position it actuates a switch 90 which in turn causes the motor 57 to reverse itself and to move the carriage back across the frame 55 to the point of beginning and in position for the start of another cycle of operation. Upon the movement of the tracing wheel along the surface of the sheet the sensing mechanism 60 is returned to its at rest position and ready for another cycle of operation. At the same time switch 90 actuates the fluid pressure within cylinder 44 to move the end of arm 40 to a position above the horizontal path of movement of the sheet on the conveyor. The switch 90 also simultaneously actuates the control valve for the jacks 96 thus causing the upward movement of the breaking roll 102. After the sheet has been broken along the trace line by the breaking roll 102 or the modification consisting of the bar 120 is returned to the neutral positions as described above. The actuation of switch 90 also causes the closing of the circuit to conveyor motor 27 to start the operation of the conveyor 21. When a section has been severed from the glass sheet 1 by the breaking device it is carried away on conveyor 21. The roller 51 on the stop mechanism 50 rides over the severed section of the glass sheet and returns to its normal position as soon as the severed section of the sheet has passed beneath it to actuate the conveyor 14 and to feed another section of sheet beneath the tracing and breaking means and toward stop mechanism 50 to repeat the above described cycle of operation.

Figure 3:
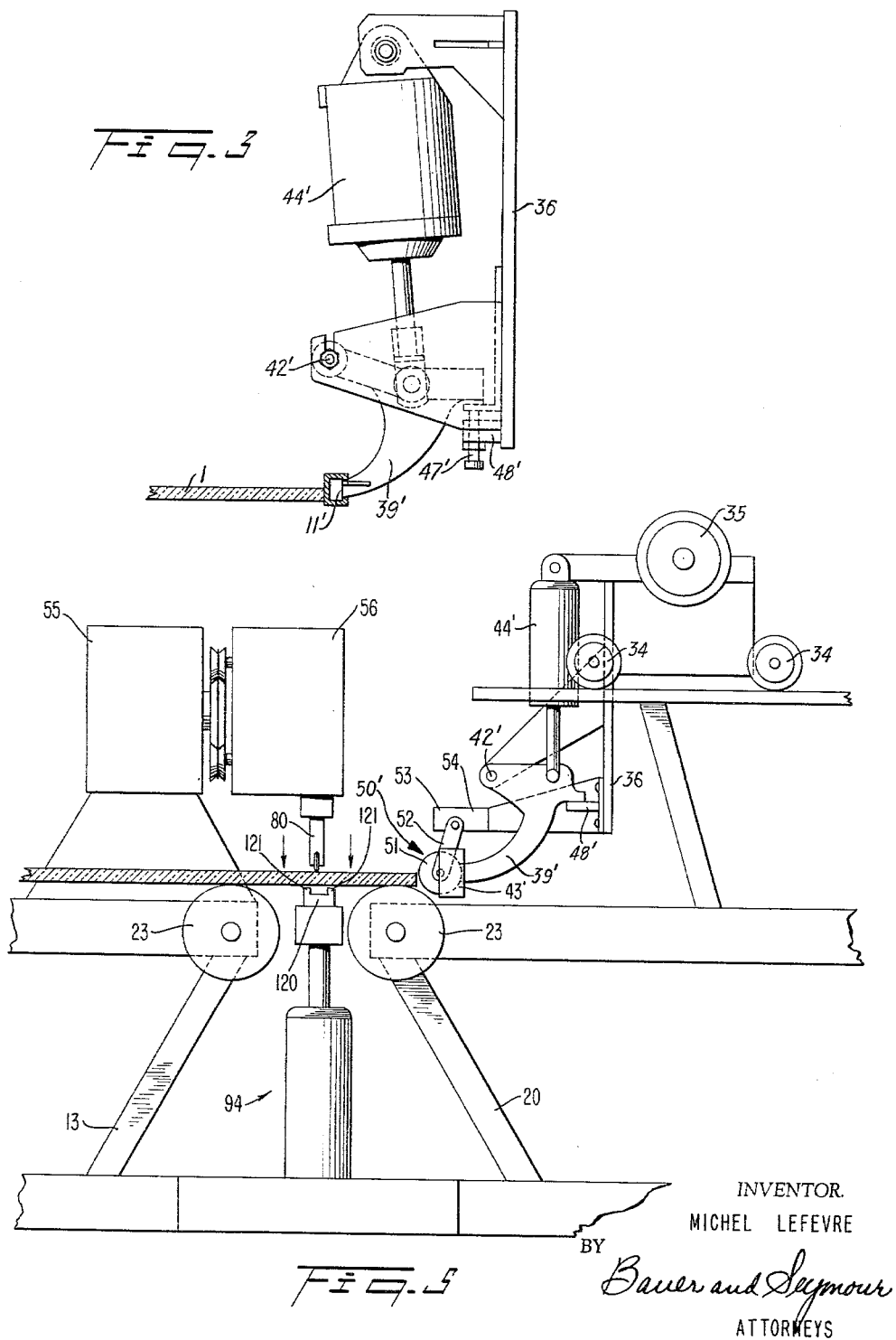
FIGURE 3 is a side elevational view showing a modification of the sheet alignment means.

In FIGS. 3 and 5 there is shown a modified construction of the sheet aligning mechanism. Such mechanism which is mounted on the vertical plate 36 of carriage 33 includes two laterally spaced bell cranks, of which one is shown, the bell cranks being connected together for simultaneously operation by a double-acting reciprocal fluid motor 44' mounted on the carriage 33. The bell cranks are pivotally mounted on aligned pivot pins 42'. The lower arm 39' of the illustrated bell crank carries an abutment 11' on its lower end, the abutments of the two bell cranks being selectively lowered by motor 44' into the glass sheet engaging position shown in FIGS. 3 and 5. The lowered, operative position of abutments 11' is determined by an adjustable abutment screw 47' having screw threaded engagement with a ledge 48' at the bottom of plate 36 of the carriage 33. The mechanism of FIG. 5 includes a conveyor stop device 50', which is substantially similar to the device 50 in the above-described embodiment of the apparatus shown in FIGS. 1, 2 and 4.

It will be apparent, from the foregoing description, that the successive operations contributing to the tracing and breaking of the glass are automatically actuated by means of a plurality of contactors inserted in the electrical circuits. The pulses resulting from the opening or closing of these contactors are transmitted to a brain or control unit which then controls the actuation or the stoppage of the electric motors and electro-valves. Such a brain, or control unit (not shown) comprises electrical elements such as voltage stabilizers, thyratrons, fuses and the like, and the pneumatic elements such as electro-valves, and the like, which are connected to a manual or automatic control panel to form a unit as known to persons skilled in the art.

While the preferred embodiment of the invention has been described in considerable detail, various modifications in its structure and operation may be made without departing from the scope of the invention. Additional contactors or other actuating devices may be added for the purpose of new operations or to modify the present operations. For example, the upstream conveyor may be made to move the glass sheet at a fast speed up to a short distance from the sheet alignment means and then made to move the sheet at a slower speed without changing the invention. The rhythm of the machine may be increased. Also the control means may be adapted to include means to predetermine a sequence of various size sheets desired to be cut and by automatically setting the stop means at the end of each tracing and breaking cycle of operation. For a definition of the limits of the invention, reference is had primarily to the appended claims.

What is claimed is:

1. In apparatus for severing sections from a glass sheet the combination of tracing means, means to move a glass sheet along a predetermined path toward the tracing means, sensing and aligning means adapted to locate and align the edge of the sheet and the tracing means relative to each other, means responsive to the operation of said sensing and aligning means to move said tracing means across said sheet to form a trace line on one surface thereof, means to apply an upward pressure on the other surface of said sheet along a line in alignment with said trace line, and means for applying a downward pressure on said one sheet surface on each side of said trace line simultaneously with the operation of said upward pressure means.

2. In an apparatus for severing sections from a glass sheet the combination of a tracing means, a conveyor to move said sheet into operative relationship with said tracing means, means to stop said conveyor when the forward edge of said sheet is positioned a predetermined distance from said tracing means, sheet alignment means actuated by said stop means to align the forward edge of said sheet relative to said tracing means, means to move said tracing means along one surface of said sheet to form a trace line thereon, means to apply an upward pressure on the other surface of said sheet at a position in alignment with said trace line, and means for applying a rotary downward pressure on said one sheet surface on each side of said trace line simultaneously with the operation of said upward pressure means.

3. In an apparatus for severing sections from a glass sheet the combination of a tracing means, a conveyor to move said sheet into operative relationship with said tracing means, means to stop said conveyor when the forward edge of said sheet is positioned a predetermined distance from said tracing means, sheet alignment means responsive to the operation of said stop means to align said sheet relative to said tracing means, sensing means to locate one edge of said sheet, means responsive to the operation of said sensing means to position said tracing means a predetermined distance from said one edge, means to move said tracing means across one surface of said sheet to form a trace line thereon, means operatively associated with said tracing means to limit the movement of the same across said one sheet surface, means operable from the other side of said sheet to lift said sheet along a line aligned with said trace line and means adjacent said one side of said sheet and spaced from each side and parallel to said trace line for applying downward pressures on said one side simultaneously with the operation of said lifting means.

4. In the apparatus as defined in claim 3 wherein said means adjacent said one surface of said sheet comprises a first means which fixedly resists the upward movement of said sheet and a second means which is yieldable to the upward movement of said sheet.

5. In the apparatus as defined in claim 4 wherein said first means is positioned on the side of said trace line which is remote from the front end of said sheet and said second means is positioned adjacent said front end.

6. In an apparatus for severing sections from a glass sheet the combination of a tracing means, means to position a portion of said sheet in operative relationship to said tracing means, sensing means to locate one edge of said sheet and to position said tracing means a predetermined distance from said one edge, means to move said tracing means across one surface of said sheet to form a trace line thereon, means to apply an upward pressure on the other surface of said sheet at a position in alignment with said trace line, and means adjacent said one sheet surface and positioned on each side of said trace line for applying a downward pressure thereto simultaneously with the application of said upward pressure.

7. In an apparatus for severing sections from a glass sheet the combination of a tracing means, means to position a portion of said sheet in operative relationship to said tracing means, said tracing means comprising a frame and a tracing tool movably mounted to said frame, means to move said frame transversely of said sheet, means to move said tracing tool toward and away from said sheet, sensing means to locate one edge of said sheet, means responsive to said sensing means to actuate said frame moving means to position said tool a predetermined distance from said one edge of a sheet, and means responsive to said positioning of the tool to actuate said tool moving means and said frame moving means to cause a trace line to be formed on one surface of said sheet.

8. An apparatus as defined in claim 7 comprising means operatively associated with said tool to limit the movement of said tool transversely of said sheet.

9. In an apparatus for severing sections from a glass sheet the combination of a tracing means, means to move said tracing means across the upper surface of said sheet to form a trace line thereon, a first and second freely rotatable abutment means positioned a predetermined distance from the upper sheet surface and parallel to said trace line, said first abutment means positioned a predetermined distance from the leading end of said glass sheet and on one side of said trace line and fixedly mounted to resist the upward movement of said sheet, said second abutment means being positioned a predetermined distance from the other side of said trace line and mounted to yield to the upward movement of said sheet, breaking means adjacent the lower surface of said sheet and having its axis in the vertical plane of said trace and parallel thereto, and means to move said breaking means upwardly in the vertical plane of said trace to apply an upward pressure on the lower surface of said sheet in precise alignment with said trace line immediately after the trace line has been formed.

10. In an apparatus for severing sections from a glass sheet the combination of a tracing means, means to move said tracing means across said sheet to form a trace line on the upper surface thereof, a first and second freely rotatable abutment means positioned adjacent the upper surface of said sheet and parallel to said trace line, said first abutment means positioned a predetermined distance from the leading end of said sheet and on one side of said trace line, means to move said first abutment means toward said sheet, said second abutment means fixedly mounted a predetermined distance above said sheet and at a predetermined distance from the other side of said trace line, breaking means adjacent the lower surface of said sheet and having its axis in the vertical plane of said trace and parallel thereto, means to move said breaking means toward said sheet, means to simultaneously actuate the moving means for said breaking means and the moving means for said first abutment means immediately after the trace line has been formed on the surface of said glass sheet.

11. In an apparatus for severing sections from a glass sheet the combination of a conveyor to move a sheet in a predetermined path, tracing means in said path, means to move said tracing means transversely of said path, means to stop said conveyor when the forward edge of said sheet is positioned a predetermined distance from said tracing means, sheet alignment means responsive to the operation of said stop means to align said sheet relative to said tracing means, sensing means responsive to the operation of said stop means to locate one edge of said sheet, and means responsive to the operation of said sensing means to actuate said tracing moving means.

12. In an apparatus for severing sections from a glass sheet the combination of a conveyor to move a sheet in a predetermined path, tracing means in said path, means to stop said conveyor when the forward edge of said sheet is positioned a predetermined distance from said tracing means, sensing means responsive to the operation of said conveyor stop to locate one edge of said sheet, means responsive to the operation of said sensing means to position said tracing means relative to said located one edge, means responsive to the positioning of said tracing means to move the same across one surface of said sheet to form a trace line thereon, and means operatively associated with said tracing means to limit the movement of the same across said one sheet surface.

References Cited by the Examiner
UNITED STATES PATENTS

| | | | |
|---|---|---|---|
| 1,117,736 | 11/14 | Whittemore | 225—96.5 |
| 1,895,779 | 1/33 | Aurien et al. | 225—2 |
| 2,212,599 | 8/40 | Hall | 225—104 |
| 2,265,028 | 12/41 | DeCroce | 83—372 X |
| 2,291,451 | 7/42 | Craig et al. | 225—2 |
| 2,302,174 | 11/42 | Boicey et al. | 225—2 |
| 2,711,617 | 6/55 | Trammell | 225—96.5 |
| 2,756,545 | 7/56 | Atkeson | 225—2 |
| 2,793,471 | 5/57 | Kurata et al. | 225—96.5 |
| 2,814,163 | 11/57 | Krulwich | 225—96 |
| 2,878,622 | 3/59 | Insolio | 225—103 |
| 2,924,044 | 2/60 | Basso | 225—103 |
| 3,016,654 | 1/62 | Lutz et al. | 225—96 |
| 3,107,834 | 10/63 | Huffman et al. | 225—96.5 |
| 3,137,425 | 6/64 | Arnaud | 225—96.5 X |

FOREIGN PATENTS

| | | |
|---|---|---|
| 1,236,148 | 6/60 | France. |

WILLIAM W. DYER, JR., *Primary Examiner.*

RAPHAEL M. LUPO, ANDREW R. JUHASZ,
*Examiners.*